United States Patent
Takanezawa et al.

(10) Patent No.: US 11,146,153 B2
(45) Date of Patent: Oct. 12, 2021

(54) METHOD OF MANUFACTURING A STATOR OF A MOTOR

(71) Applicant: TOYOTA JIDOSHA KABUSHIKI KAISHA, Toyota (JP)

(72) Inventors: Yu Takanezawa, Nisshin (JP); Daisuke Mizushima, Toyota (JP); Rikuto Takagi, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 198 days.

(21) Appl. No.: 16/418,326

(22) Filed: May 21, 2019

(65) Prior Publication Data
US 2019/0372438 A1 Dec. 5, 2019

(30) Foreign Application Priority Data
May 30, 2018 (JP) .............................. JP2018-103204

(51) Int. Cl.
- *H02K 15/00* (2006.01)
- *H02K 15/085* (2006.01)
- *H02K 3/12* (2006.01)
- *H02K 1/16* (2006.01)

(52) U.S. Cl.
CPC ........... *H02K 15/0068* (2013.01); *H02K 1/16* (2013.01); *H02K 3/12* (2013.01); *H02K 15/085* (2013.01); *Y10T 29/49009* (2015.01)

(58) Field of Classification Search
CPC ......... Y10T 29/49826; Y10T 29/49009; Y10T 29/49073; Y10T 29/49012; Y10T 29/49071; Y10T 29/53143; Y10T 29/5353; H02K 15/005; H02K 15/0435; H02K 15/045; H01F 41/02
USPC .................. 29/596, 598, 604, 605, 606, 732
See application file for complete search history.

(56) References Cited

U.S. PATENT DOCUMENTS

| | | | |
|---|---|---|---|
| 4,158,831 A * | 6/1979 | Ragan | H01C 1/12 338/174 |
| 2003/0135980 A1 | 7/2003 | Ichikawa et al. | |
| 2006/0138894 A1* | 6/2006 | Harada | H02K 15/02 310/216.004 |
| 2013/0009509 A1 | 1/2013 | Tsuge et al. | |

FOREIGN PATENT DOCUMENTS

| | | |
|---|---|---|
| JP | 2003-219588 A | 7/2003 |
| JP | 2011-188724 A | 9/2011 |
| JP | 2014-161176 A | 9/2014 |

* cited by examiner

*Primary Examiner* — Thiem D Phan
(74) *Attorney, Agent, or Firm* — Sughrue Mion, PLLC (57) ABSTRACT

An arm of a coil segment having an approximate U shape is placed in a slot of a stator core, and a portion protruding from the slot is bent in a circumferential direction. An arm is bent in a direction of an arrow A, and another arm positioned at an inner side in the radial direction in relation to this arm is bent in a direction of an arrow B. The arm positioned at the outer side has at least a part of a bending inner side surface of a bent portion hardened by pressurization.

5 Claims, 13 Drawing Sheets

METHOD OF MANUFACTURING A STATOR OF A MOTOR

CROSS REFERENCE TO RELATED APPLICATION

This application claims priority to Japanese Patent Application No. 2018-103204 filed on May 30, 2018, which is incorporated herein by reference in its entirety including the specification, claims, drawings, and abstract.

TECHNICAL FIELD

The present disclosure relates to a stator of a motor and to a method of manufacturing the stator of the motor, and in particular to a stator coil.

BACKGROUND

A stator of a motor comprises a stator core having teeth which are arranged in a circumferential direction, and a stator coil wound around the teeth of the stator core. There is known a stator coil which is manufactured by mounting coil segments which are divided into a few pieces on the stator core and connecting the coil segments by welding. The coil segment is formed by bending a conductive wiring in an approximate U shape, and is inserted into a slot which is a space between the teeth of the stator core. A tip portion of a coil segment protruding from an end surface of the stator core is bent in the circumferential direction, and tips of the corresponding coil segments are welded together, to form the stator coil.

JP 2003-219588 A discloses a stator coil which is formed by bending in a circumferential direction a portion of a coil segment (basic segment 33) which protrudes from an end surface of a stator core (stator iron core 32), and welding together tips of corresponding coil segments (33). At a portion of the stator coil which is outside of the end surface of the stator core (32); that is, at a coil end, the bent coil segments cross each other. Member names and reference numerals described above in parentheses are those used in JP 2003-219588 A, and are not related to the member names and reference numerals used in the description of the embodiment of the present disclosure.

When the conductive wiring which forms the coil segment is bent at the coil end, there is a possibility that adjacent conductive wirings cross and contact each other, causing damages of an insulating coating on a surface of the conductive wiring.

An advantage of the present disclosure lies in suppression of damages of the insulating coating of the conductive wiring when the coil end is formed by bending the conductive wiring of the coil segment.

SUMMARY

According to one aspect of the present disclosure, there is provided a method of manufacturing a stator of a motor, comprising: forming a coil segment by bending a flat type conductive wiring into an approximate U shape with two arms; inserting the coil segment into a slot, of a stator core having teeth arranged in a circumferential direction, between adjacent teeth; forming a coil ending portion by bending the arm of the coil segment in the circumferential direction; and welding tips of corresponding arms. In the inserting the coil segment, the arm of the coil segment is arranged such that a radial direction line arranged in a radial direction is formed and a circumferential direction line arranged in the circumferential direction is formed. In fainting the coil end portion, arms belonging to the same circumferential line are bent in a first direction, and arms belonging to a circumferential direction line adjacent to this circumferential direction line are bent in a second direction which is opposite the first direction. Further, in forming the coil segment, at least a part of a bending inner side surface of a portion bent in forming the coil end portion, of an arm belonging to at least one circumferential direction line, is pressurized and hardened.

In forming the coil segment, a portion outside in the radial direction of the bending inner side surface of the arm may be hardened.

In forming the coil end portion, a circumferential direction line pair is formed by two adjacent circumferential direction lines, and the arms are bent in the circumferential direction in an order of the circumferential direction line pairs from the one positioned at an outer side or an inner side in the radial direction. The arm pressurized and hardened in the forming the coil segment may be the arm belonging to the circumferential direction line positioned at an outer side in the circumferential direction, among the circumferential direction lines forming the circumferential direction line pair.

In forming the coil end portion, a sectioning wall which sections the circumferential direction lines every two lines is placed between the circumferential direction lines, and the arms are bent in the circumferential direction. The arm which is pressurized and hardened in the forming the coil segment may be the arm belonging to the circumferential direction line positioned at an outer side in the radial direction, among the two sectioned circumferential direction lines.

In fainting the coil segment, a tip of the arm which is welded later can be shaped into a predetermined shape by pressurization.

According to another aspect of the present disclosure, there is provided a stator of a motor, comprising: a stator core that has teeth arranged in a circumferential direction and in which a slot is formed between adjacent teeth; and a stator coil in which a plurality of coil segments formed from a flat type conductive wiring are joined and that is wound around the stator core. The coil segment has an in-slot portion which is inserted into two slots of the stator core, a first coil end portion which connects the in-slot portions at a side of a first end surface of the stator core, and a second coil end portion which is bent in the circumferential direction at a side of a second end surface of the stator core. Tips of second coil end portions of corresponding coil segments are welded together. The second coil end portion is arranged to form a radial direction line arranged in a radial direction and to form a circumferential line arranged in the circumferential direction. A bent portion of the second coil end portion belonging to at least one circumferential direction line has a portion in which at least a part of a bending inner side surface is hardened by pressurization.

A portion, of the bending inner side surface of the second coil end portion, outside in the radial direction may be hardened.

The hardened second coil end portion may be the second coil end portion belonging to a circumferential direction line of an odd number from the outer side in the radial direction.

By hardening a bending inner side surface of a portion, of the conductive wiring forming the stator coil, which is bent after mounting onto the stator core, it becomes possible to suppress contact of adjacent conductive wirings, and to suppress damages of the insulating coating.

BRIEF DESCRIPTION OF DRAWINGS

Embodiment(s) of the present disclosure will be described by reference to the following figures, wherein.

DESCRIPTION OF EMBODIMENTS

Figure 1:
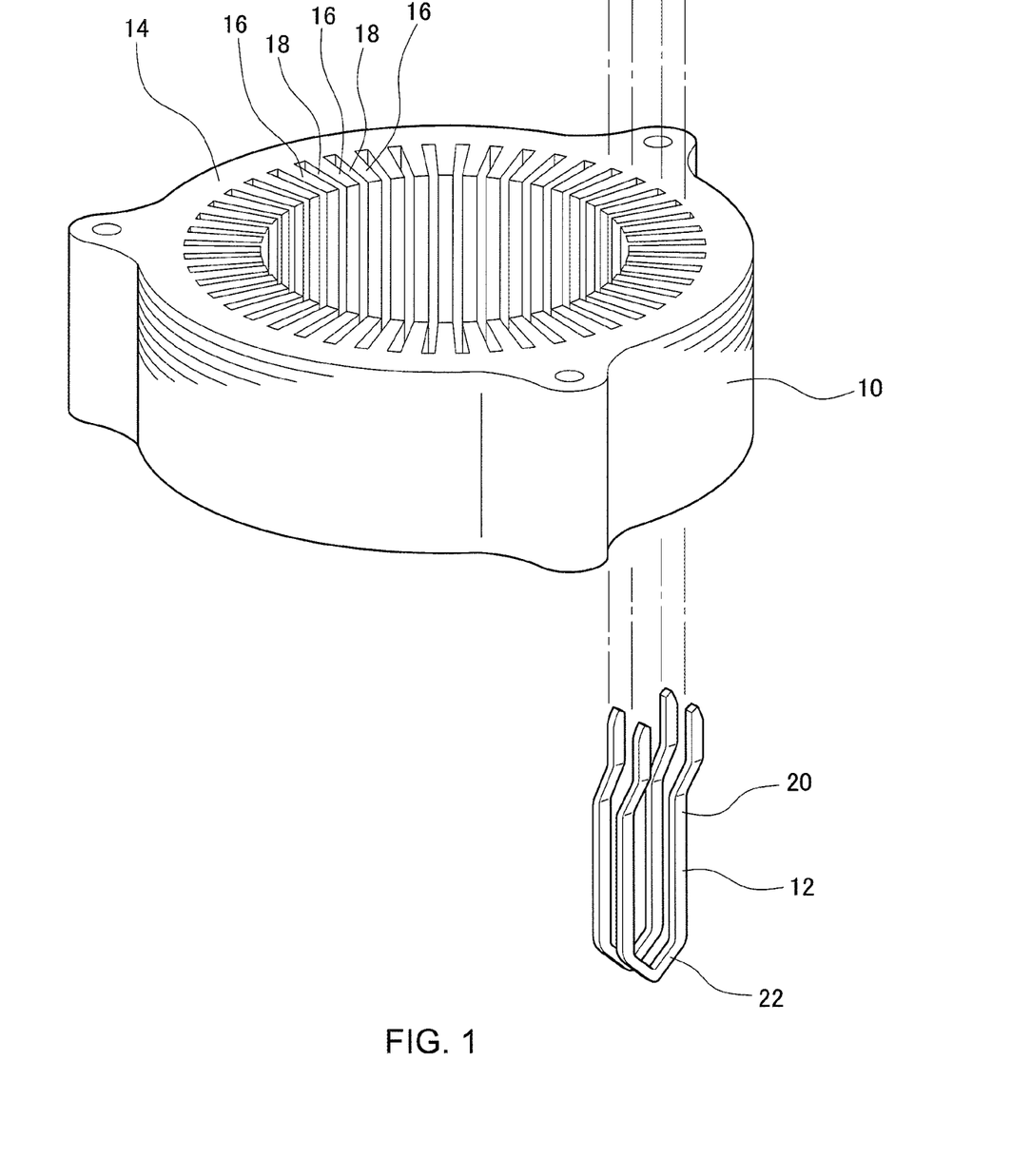
FIG. 1 is a diagram showing a stator core and a coil segment.

An embodiment of the present disclosure will now be described with reference to the drawings. FIG. 1 is a diagram showing a coil segment 12 which forms a coil with a stator core 10 of a rotary electric motor. The stator core 10 has an approximate circular tubular shape, and has a yoke 14 having an approximate circular tubular shape, and teeth 16 which extend from the yoke 14 toward an inner side in a radial direction. A direction along a center axis of the circular tube of the stator core 10 is described as an axial direction, a direction orthogonal to the center axis is described as a radial direction, and a direction circling around the center axis is described as a circumferential direction.

The teeth 16 are arranged in the circumferential direction with a spacing therebetween, and a space between adjacent teeth 16 is called a slot 18. The coil segment 12 is formed from a conductive wiring having a rectangular cross section (flat type conductive wiring) on a surface of which an insulating coating such as enamel is formed. The coil segment 12 is formed by bending a conductive wiring in an approximate U shape. Portions corresponding to straight line portions at left and right sides of the U shape are described as arms 20, and a portion corresponding to a bottom portion connecting the straight line portions is described as a bottom 22. Two arms 20 are respectively inserted into slots 18 different from each other, to mount the coil segment 12 on the stator core 10, and a tip of the arm 20 is set to protrude from an end surface (upper end surface in FIG. 1) of the stator core 10.

Figure 2:
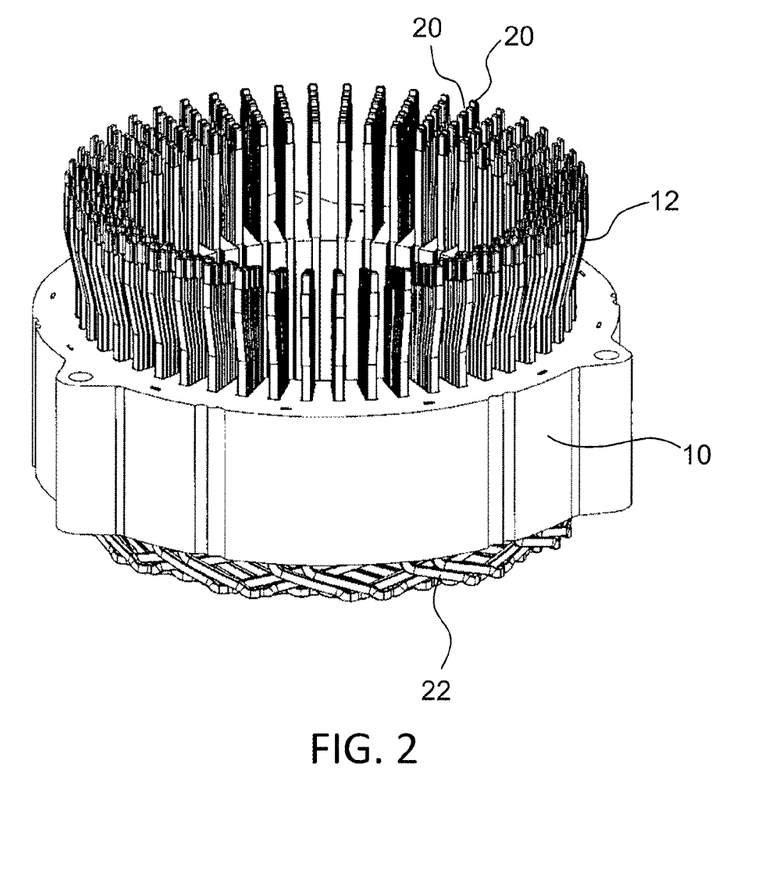
FIG. 2 is a diagram showing a state in which coil segments are mounted onto a stator core.
Figure 3:
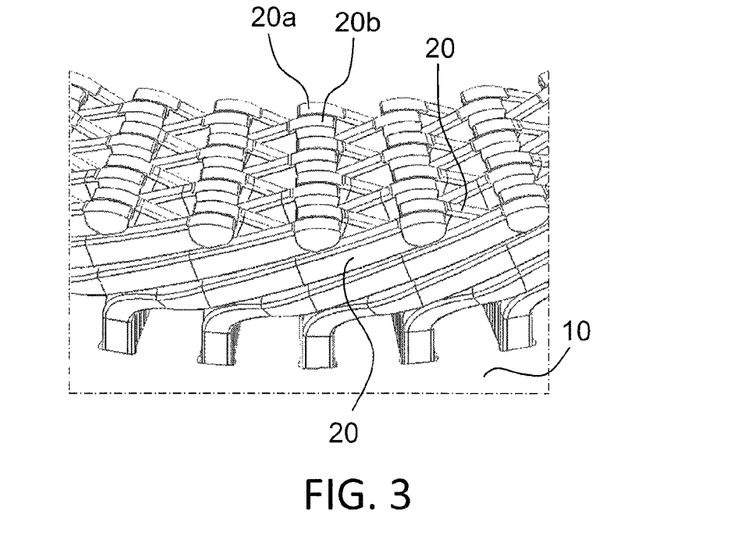
FIG. 3 is a diagram showing a state in which coil segments are bent in a circumferential direction and before tips are welded.

FIG. 2 shows a state in which the coil segment 12 is mounted on the stator core. From this state, a portion of the arm 20 sticking out from the end surface of the stator core 10 is bent in the circumferential direction. FIG. 3 shows a state in which the arm 20 is bent. Tips (for example, tips 20a and 20b of the arm shown in FIG. 3), of two arms 20, which are adjacent in the radial direction, are welded together, to connect a plurality of coil segments 12 and to consequently form a stator coil 24.

Figure 4:
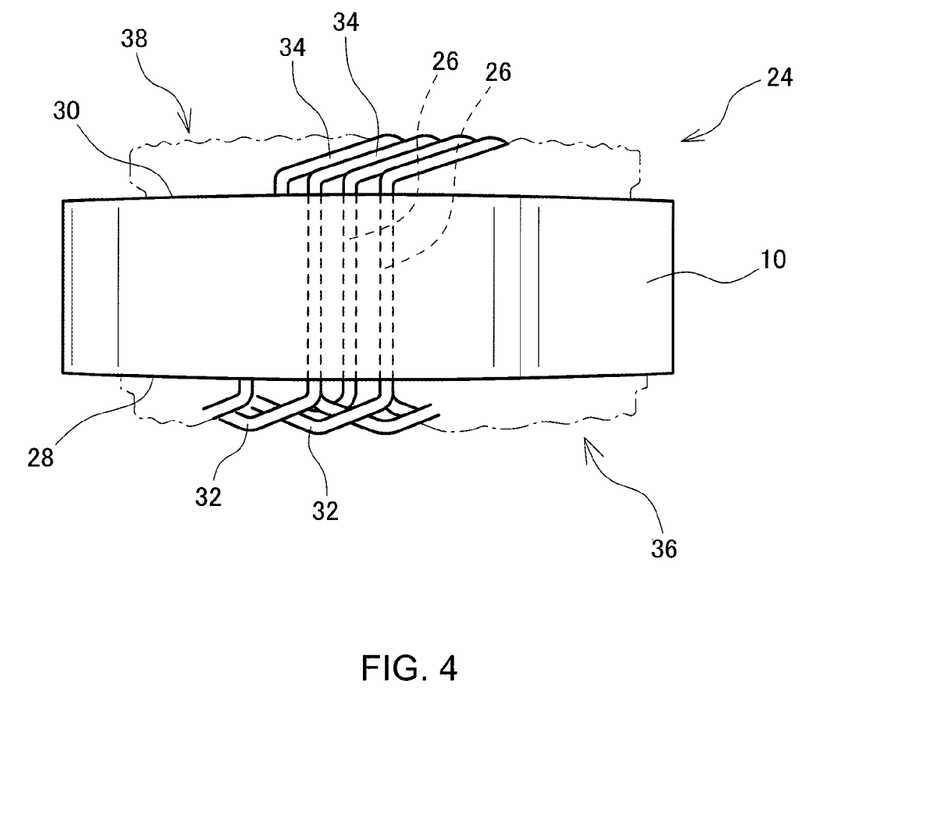
FIG. 4 is a diagram showing a state in which coil segments are welded and the stator coil is formed.

FIG. 4 shows a state in which the coil segments 12 are welded together and the stator coil 24 is formed. The coil segment 12 has an in-slot portion 26 placed in the slot, and coil end portions 32 and 34 which connect the in-slot portions at an outside of end surfaces 28 and 30 of the stator core in the axial direction. In FIG. 4, at a side of the first end surface 28 which is at a lower side, the bottom 22 of the coil segment 12 serves as the first coil end portion 32, and a first coil end 36 is formed. At the side of the second end surface 30 which is at an upper side, the second coil end portions 34 which are portions, of the arms 20 of the coil segments 12, protruding from the slot 18 form a second coil end 38 by tips thereof being welded together.

Figure 5:
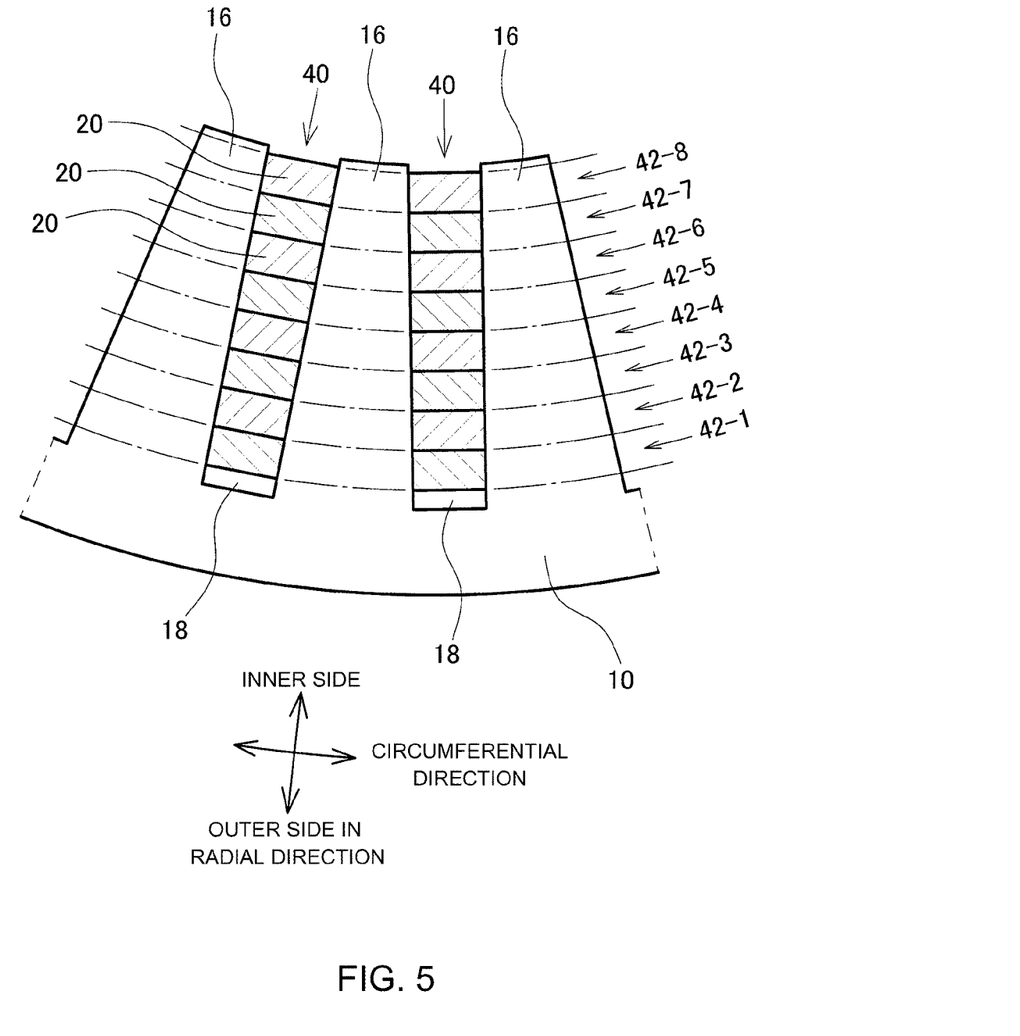
FIG. 5 is a cross-sectional diagram orthogonal to an axis, showing an arm of a coil segment placed in a slot.

FIG. 5 is a diagram showing a part of a cross section orthogonal to the axis of the stator. In FIG. 5, an upper side is an inner side in the radial direction, and a lower side is an outer side in the radial direction. In the slot 18 of the stator core 10, the arms 20 of the coil segments 12 are placed. Eight arms 20 are placed in one slot 18, which are arranged in a line in the radial direction. The line of the arms 20 arranged in the radial direction is described as a radial direction line 40. The arms 20 are also arranged in a direction crossing the slot 18; that is, the circumferential direction, to form a line. This line is described as a circumferential direction line 42. Eight circumferential direction lines 42 are formed corresponding to the number of arms 20 placed in one slot 18, which is eight, and are placed in a concentric shape. When an individual line of the 8 lines of circumferential direction lines 42 needs to be distinguished, the element will be described with branch numbers -1, -2, . . . -8 added, starting from the side of the outer circumference.

A portion, of the arm 20 of the coil segment 12 inserted into the slot 18, protruding from the second end surface 30 of the stator core 10 (second coil end portion 34) is bent in the circumferential direction. In this process, arms 20 belonging to the same circumferential direction line 42 are bent in the same direction, and the circumferential direction line 42 which is adjacent to this line is bent in the opposite direction. In the following description, a case will be exemplified and described in which circumferential direction lines 42-1, 42-3, 42-5, and 42-7 which are of odd numbers from the outer side are bent toward the right in FIG. 5, and circumferential direction lines 42-2, 42-4, 42-6, and 42-8 which are of even numbers are bent toward the left in FIG. 5.

When the arms 20 are bent, the arms 20 are bent in a group of two lines and in the order from the circumferential direction line 42 at the outer side in the radial direction. That is, first, the arm 20 belonging to the outermost circumferential direction line 42-1 and the arm 20 belonging to the circumferential direction line 42-2 which is a second line are bent in directions opposite from each other. Then, the arms of the circumferential direction line 42-3 which is a third line and of the circumferential direction line 42-4 which is a fourth line are bent, the arms of the circumferential lines 42-5 and 42-6 which are fifth and sixth lines, respectively, are bent, and, finally, the arms 20 of the circumferential direction lines 42-7 and 42-8 which are seventh and eighth lines, respectively, are bent. A pair is formed by two adjacent circumferential direction lines 42 for which the arms 20 are simultaneously bent, and bending machining of the arms 20 is executed in the order from the pair of the circumferential direction line at the outer side. Alternatively, the arms 20 may be bent two lines at a time and in the order from the circumferential direction line 42 at the inner side in the radial direction.

Figure 6:
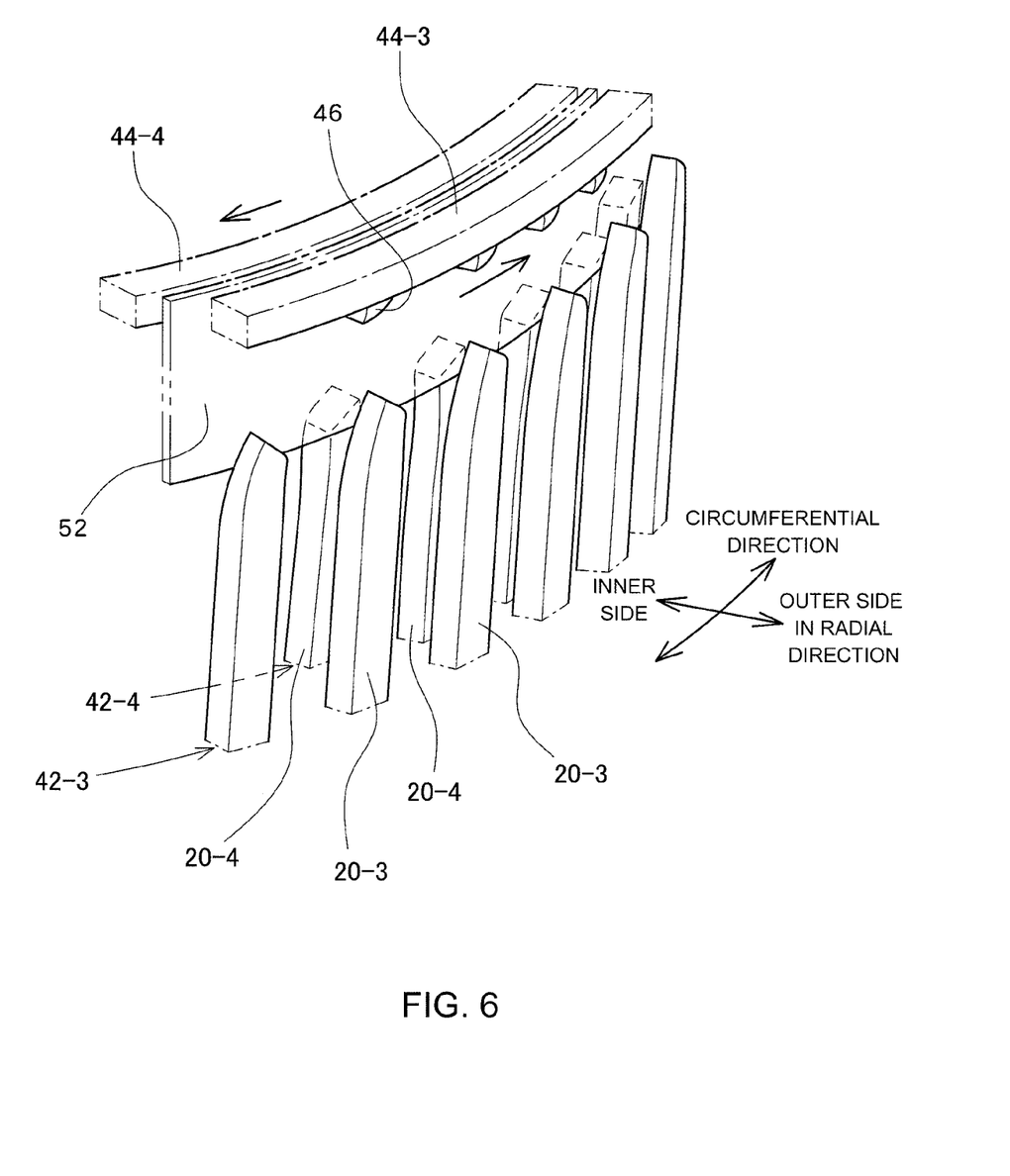
FIG. 6 is an explanatory diagram of a bending machining of an arm of a coil segment, and is a perspective diagram showing a state before bending.
Figure 7:
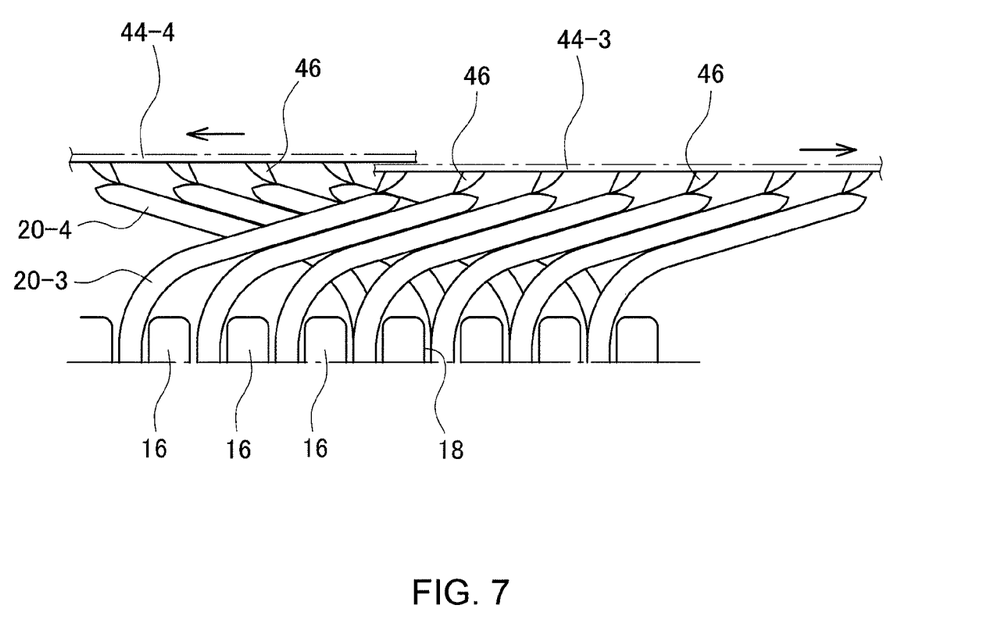
FIG. 7 is an explanatory diagram of a bending machining of an arm of a coil segment, and is an expansion view viewed from an outer side in a radial direction, showing a state after bending.
Figure 8:
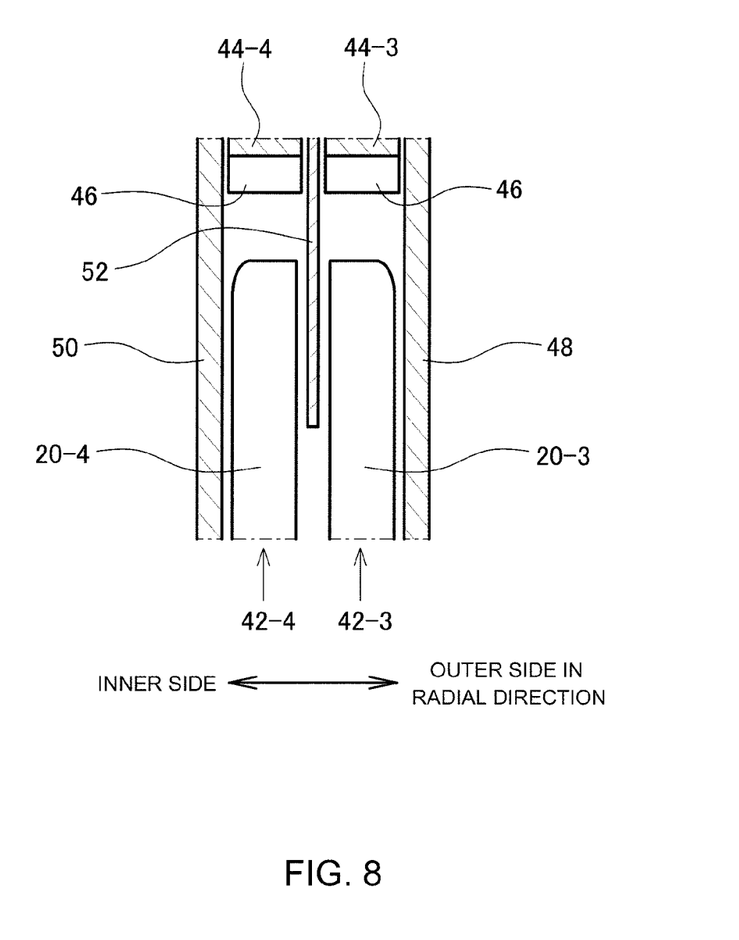
FIG. 8 is an explanatory diagram of a bending machining of an arm of a coil segment, and is a diagram viewed along a circumferential direction and showing a state before bending.

FIGS. 6 to 8 are schematic explanatory diagrams of a process of bending the arm 20. FIG. 6 is a perspective diagram, FIG. 7 is an expansion view viewed from the outer side in the radial direction, and FIG. 8 is a diagram viewed along the circumferential direction. In FIGS. 6 to 8, as an example configuration, arms 20 belonging to the third and fourth circumferential direction lines 42-3 and 42-4 and structures corresponding to these arms 20 are shown. The arm belonging to the third circumferential direction line 42-3 is shown by reference numeral 20-3, and the arm belonging to the fourth circumferential direction line 42-4 is shown by reference numeral 20-4. A bending cast 44 is placed corresponding to each circumferential direction line 42. A bending cast corresponding to the third circumferential direction line 42-3 is shown by reference numeral 44-3, and a bending cast corresponding to the fourth circumferential direction line 42-4 is shown by reference numeral 44-4. On a surface of the bending cast 44 opposing the tip of the arm 20, an engagement hook 46 which engages with the tip of the arm 20 during the bending machining is provided, corresponding to the tip of the arm 20.

As shown in FIG. 8, an outer guide wall 48 having a circular tubular shape is placed as an arm supporting jig at the outer side in the radial direction of the third circumferential direction line 42-3, and an inner guide wall 50 having a circular tubular shape is placed at an inner side in the radial direction of the fourth circumferential direction line 42-4. In addition, between the third and fourth circumferential direction lines 42-3 and 42-4, an intermediate guide wall 52 is placed as an intermediate supporting jig. In FIGS. 6 and 7, the outer and inner guide walls 48 and 50 are not shown. When the bending cast 44 is lowered to cause the engagement hook 46 to engage the tip of the arm 20, and the bending cast 44 is rotated in the circumferential direction as shown by arrows in FIGS. 6 and 7, the arm 20 is bent down by the engagement hook 46, and a region near a root of a portion protruding from the slot 18 is bent. In this process, the arm 20 is bent down along the guide walls 48, 50, and 52.

The arm 20 is bent in a plane orthogonal to the center axis, in addition to the bending in a tangential plane of the circular tubular surface having the center axis of the stator core 10 as an axis. Because of this, there is a possibility that the arm 20 is deformed in a complicated manner, and adjacent arms 20 contact each other. When a pressure of the contact is strong, the insulating coating of the arm 20 is damaged. In the present embodiment, a part of the arm 20 of the coil segment 12 is pressurized and hardened, and deformation of the hardened portion is suppressed, so as to suppress contact between arms 20 due to the deformation during the bending machining.

Figure 9:
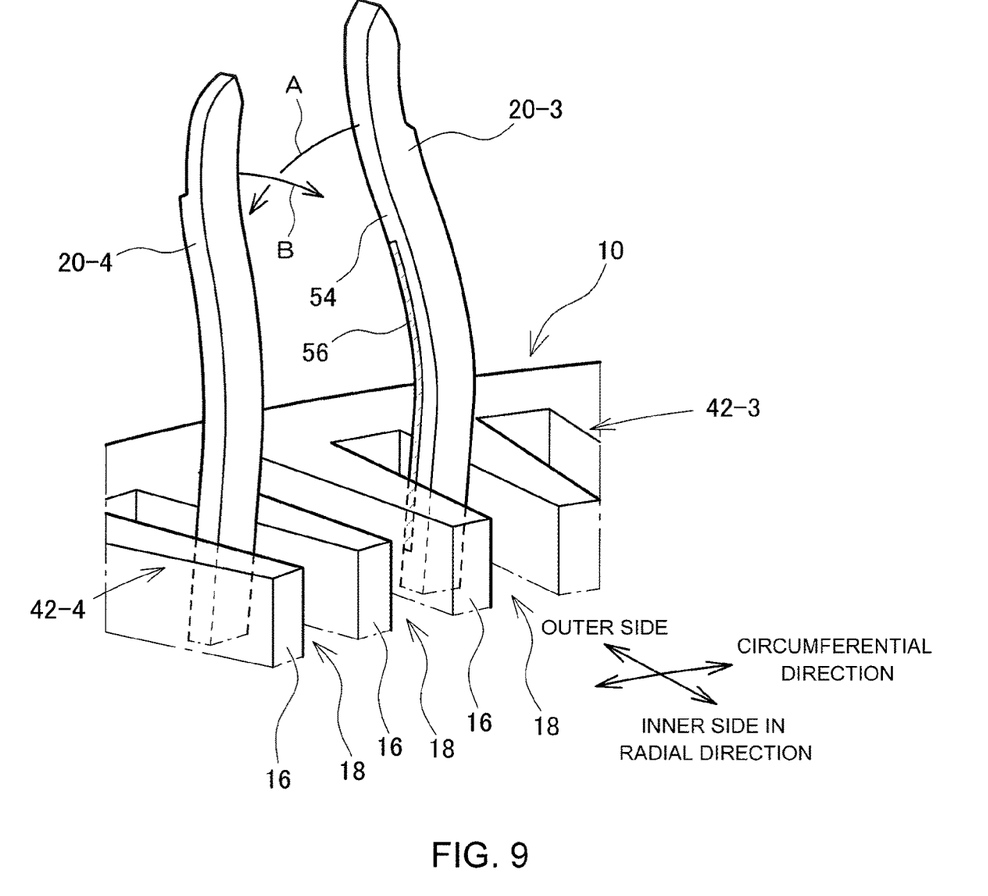
FIG. 9 is a perspective diagram showing an example of a hardened portion of a coil segment.
Figure 10:
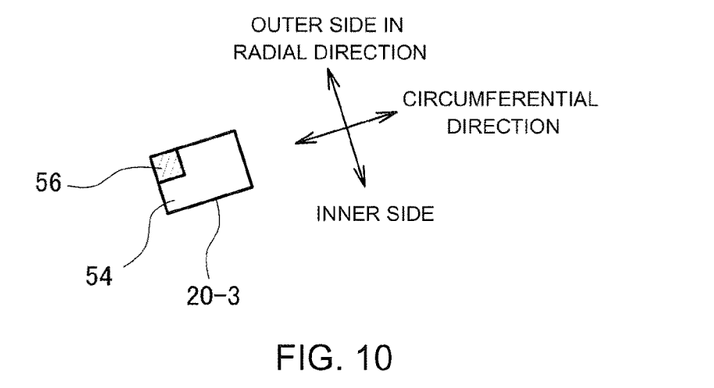
FIG. 10 is a cross-sectional diagram showing an example of a hardened portion of a coil segment.

FIGS. 9 and 10 are diagrams showing the hardened portion of the arm 20. FIG. 9 shows arms 20-3 and 20-4 belonging to the circumferential direction lines 42-3 and 42-4 as examples of the arms 20 belonging to two circumferential direction lines 42 which are simultaneously bent. FIG. 10 is a cross-sectional diagram of the arm 20-3. The arm 20-3 is bent in a first direction as shown by an arrow A in these figures, and the arm 20-4 is bent in a second direction opposite the first direction as shown by an arrow B in these figures. When the arm 20-3 is bent in the circumferential direction, a hardened portion 56 is located in a side surface 54 at an inner side of the bending (hereinafter, referred to as a bending inner side surface 54). In FIGS. 9 and 10, a portion to which slanted lines are applied is the hardened portion 56. In this example configuration, a portion at an outer side in the radial direction of the bending inner side surface 54; that is, a corner portion at the outer side in the radial direction, is hardened. The hardened portion 56 is formed, for example, by deforming the portion by press machining, to cause work hardening. In this example configuration, a work hardening are caused to a degree in which the deformation is not caused until a stress becomes 150 MPa.

Figure 11:
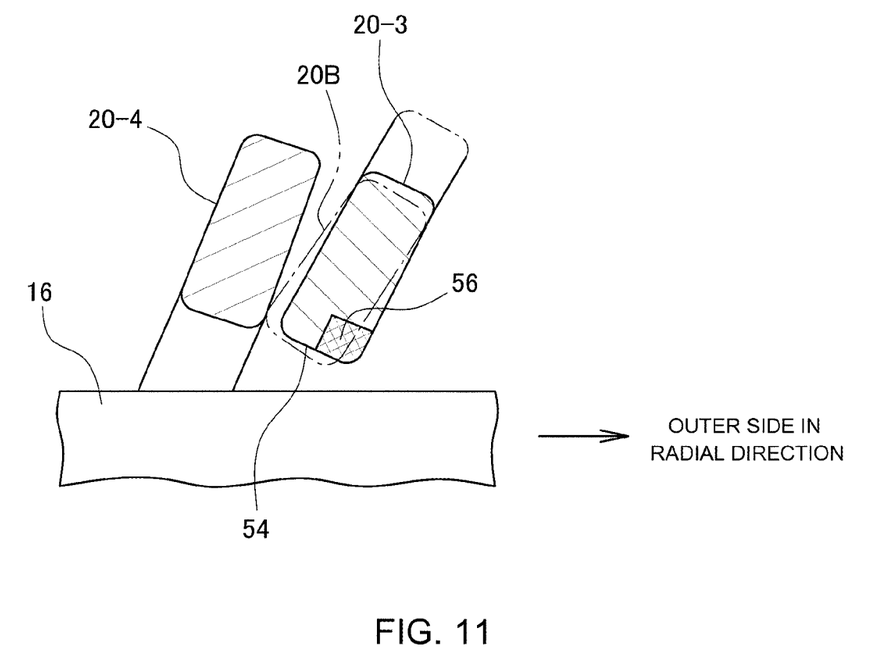
FIG. 11 is a diagram showing a state after the arms of the coil segments of FIGS. 9 and 10 are bent.

FIG. 11 is a diagram showing a cross section orthogonal to the circumferential direction, after the arm 20 is bent. A double-chain line is applied to the hardened portion 56. FIG. 11 shows a cross section of a portion where the adjacent arms 20 are closest to each other. The arm 20-3 extends out of the slot 18 positioned at a front side of the page of FIG. 11, and toward the back side of the page, and the arm 20-4 extends out of the slot 18 at the back side of the page and toward the front side of the page. In FIG. 11, as a comparative example, a cross section of an arm 20B in which the hardened portion 56 is not provided is shown by a one-dot-and-chain line. The arm 20B is in contract with the adjacent arm 20-4, and thus, the insulating coating may be damaged at the contact portion. On the other hand, the arm 20-3 in which the hardened portion 56 is provided is not in contact with the arm 20-4, and, thus, the damage of the insulating coating can be suppressed. The cross sections of the arm 20-3 and the arm 20B shown in FIG. 11 are both inclined in the direction to the right, but the degree of inclination of the arm 20-3 is smaller, and a size in the radial direction is smaller. With the provision of the hardened portion 56, the size in the radial direction can be kept small. As a result, the contact with the adjacent arm 20-4 can be avoided. With regard to the arm 20-4 positioned at the inner side in the radial direction also, with the provision of the hardened portion on the bending inner side surface, the size in the radial direction can be kept small. Therefore, with the provision of the hardened portion on the arm 20-4 also, the contact between the adjacent arms 20-3 and 20-4 can be avoided.

Figure 12:
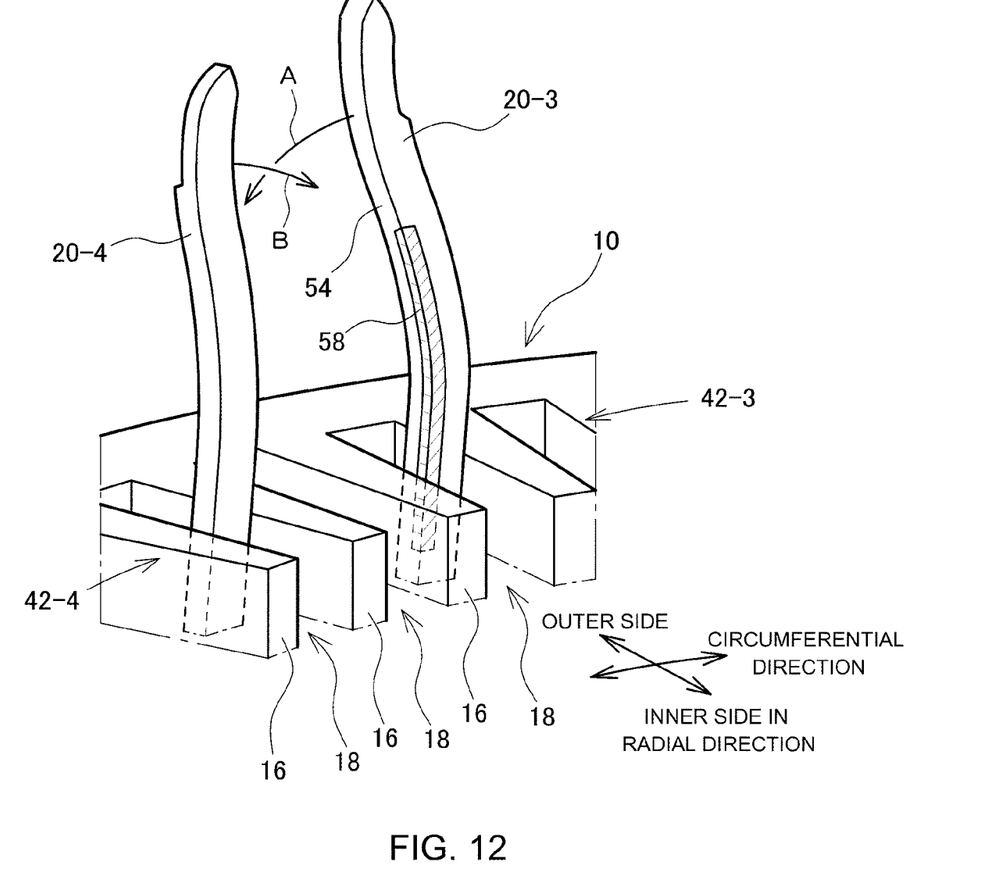
FIG. 12 is a perspective diagram of a hardened portion of a coil segment, showing another example.
Figure 13:
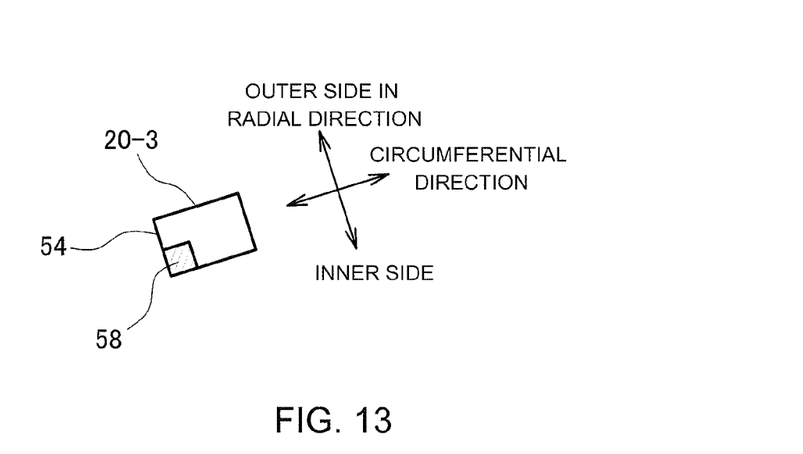
FIG. 13 is a cross-sectional diagram of a hardened portion of a coil segment, showing another example.
Figure 14:
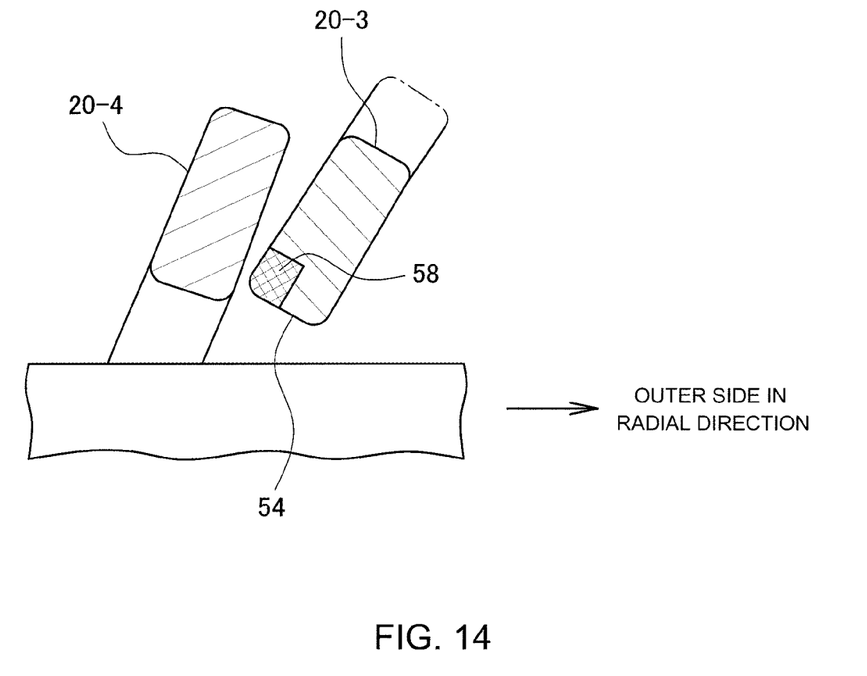
FIG. 14 is a diagram showing a state after the arms of the coil segments of FIGS. 12 and 13 are bent.

FIGS. 12 and 13 are diagrams showing another example of the hardened portion of the arm 20. A hardened portion 58 in this example configuration is positioned at a portion at an inner side in the radial direction of the bending inner side surface 54; that is, at a corner portion at the inner side in the radial direction. In this case also, as shown in FIG. 14, the contact with the adjacent arm 20-4 is avoided. Based on these two example configurations, by pressurizing and hardening at least a part of the bending inner side surface 54, contact of arms 20 which are simultaneously bent can be avoided, and the damages of the insulating coating can be suppressed.

With the provision of the hardened portions 56 and 58 in the bending inner side surface 54 of the arm 20 as described above, the deformation of the arm 20 can be controlled and the damage of the insulating coating can be avoided. The shapes of the arms 20 differ depending on the circumferential direction lines 42 to which the arms 20 belong, and the form of deformation during the bending in the circumferential direction differ. Therefore, in some of the pairs of the circumferential direction lines 42, the damage of the insulating coating may be avoided even if the hardened portions 56 and 58 are not formed. In this case, it is not necessary to form the hardened portions 56 and 58.

Figure 15:
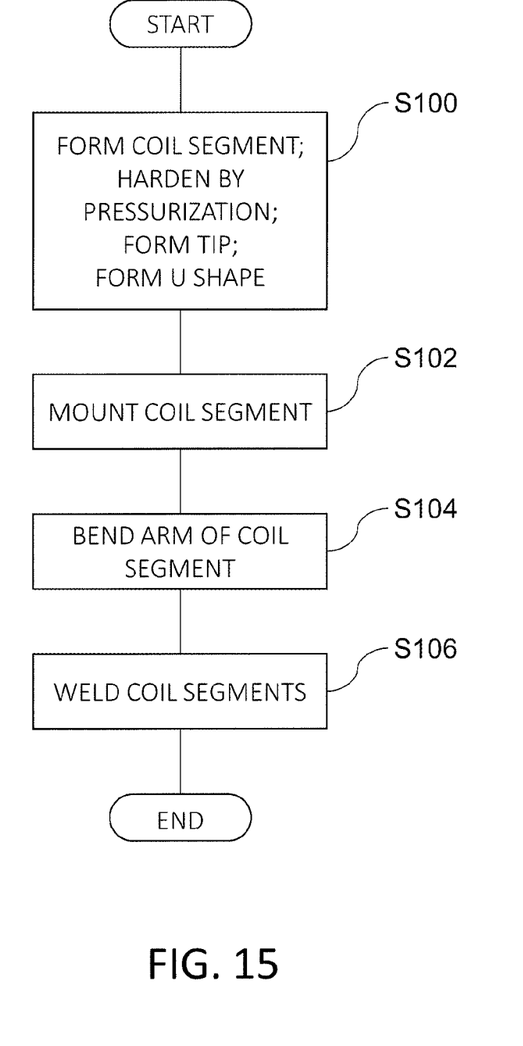
FIG. 15 is a flowchart showing a manufacturing process of a stator; in particular, a stator coil.

FIG. 15 is a flowchart related to a method of manufacturing a stator; in particular, a method of manufacturing a stator coil. In step S100 in which a coil segment 12 is formed, pressurization is applied for hardening to a predetermined part of a flat type conductive wiring which is a material of the coil segment 12. In addition, the flat type conductive wiring is cut in a predetermined length, and a shape of the tip portion is formed into a shape suited for welding to be executed later. Specifically, the tip portion is formed into a shape such that the tips 20a and 20b of the arms to be welded are matched surfaces when the arms 20 of the coil segments 12 are bent as shown in FIG. 3. The pressurization for the hardening, the formation of the tip shape, and the cutting of the flat type conductive wiring can be simultaneously executed by press machining. The flat type conductive wiring which is cut in the predetermined length is bent to form a predetermined shape which is an approximate U shape.

In step S102, the coil segment 12 which is formed in the U shape is mounted onto the stator core 10. Two arms 20 of the coil segment 12 are inserted into different slots 18, and the tip portions of the arms 20 are caused to protrude from the second end surface 30 of the stator core 10. At the side of the first end surface 28 of the stator core 10, the coil end is formed by the bottom 22 of the coil segment 12. In the slot 18, the arms 20 are arranged in one line in the radial direction, to form the radial direction line 40. The arms 20 arranged in the radial direction form the circumferential direction line 42 extending in the circumferential direction across the slots 18. The arms 20 placed in one slot 18 belong to circumferential direction lines which differ from each other.

In step S104, the tip portion of the arm 20 protruding from the second end surface 30 of the stator core 10 is bent in the circumferential direction. Arms 20 belonging to the same circumferential direction line 42 are bent in the same direction. Arms 20 belonging to adjacent circumferential direction lines are bent in directions opposite from each other. The bending of the arms 20 is executed two lines at a time in an order from the outer side or from the inner side.

In step S106, tips of the corresponding arms 20 are welded together. With this process, the coil segments 12 are connected, and the stator coil 24 wound around the teeth 16 is formed. The stator coil 24 is a distributed winding coil in which coils of three phases are placed with a shift in the circumferential direction while having an overlap therebetween.

Figure 16:
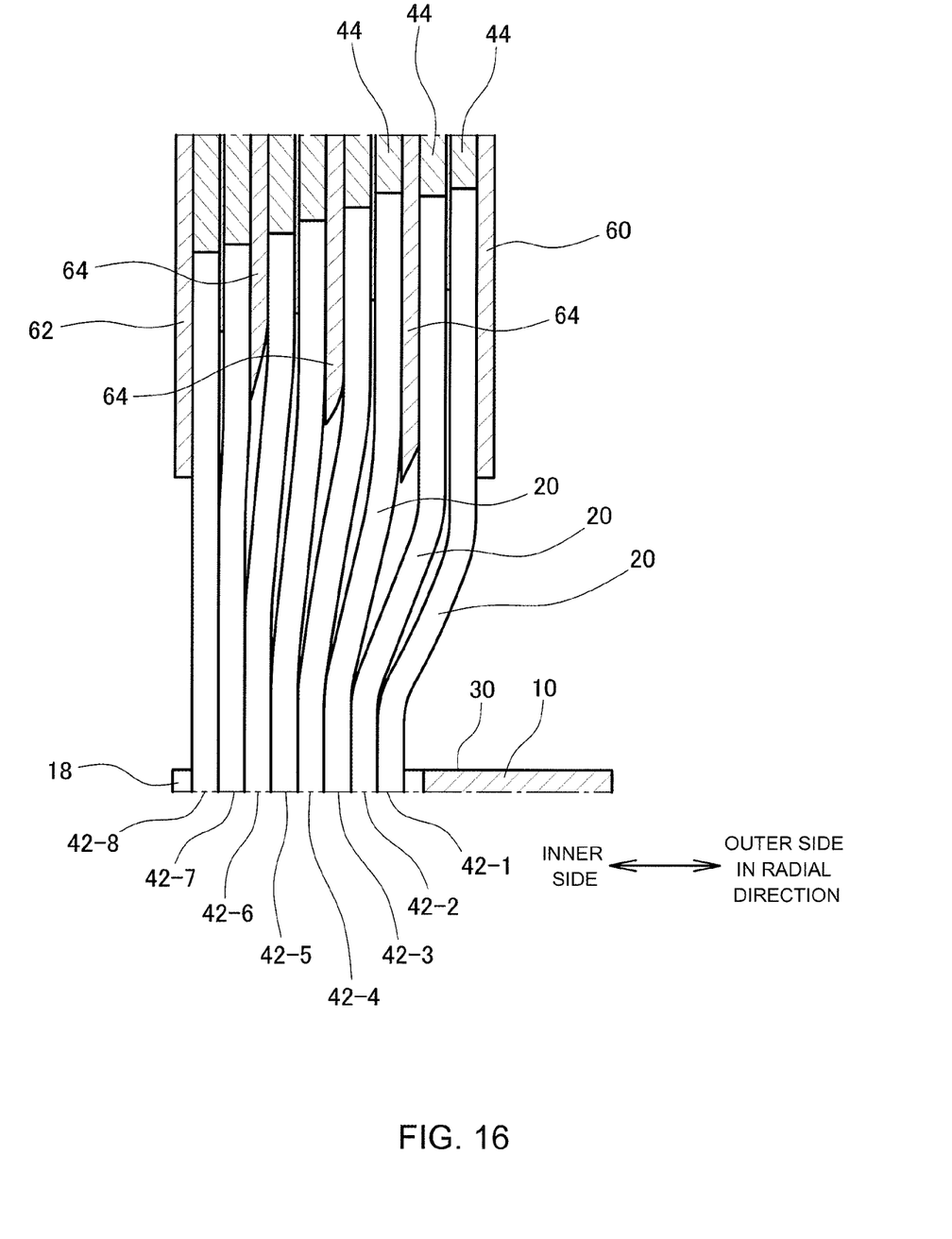
FIG. 16 is an explanatory diagram of another form of a bending machining of a coil segment.

FIG. 16 is a diagram showing another form of the bending machining of the arm 20. In this form, the arms 20 are identical to those described above, but are bent at once, in place of bending by two lines at a time. Tip portions of the arms 20 arranged in the radial direction in the slot 18 protrude from the second end surface 30 of the stator core 10 and extend upward in FIG. 16. The bending cast 44 having the engagement hook is placed for each circumferential direction line 42, and is in contact with the tip of the arm 20. An outer guide wall 60 having a circular cylindrical shape is placed adjacent at an outer side of the circumferential direction line 42-1 which is at the outermost side, and an inner guide wall 62 is placed adjacent at an inner side of the circumferential direction line 42-8 which is at the innermost side. Further, a sectioning wall 64 is placed every two lines. The circumferential direction lines 42 are sectioned by the sectioning wall 64, to form pairs, each including two lines. Of the pair of the circumferential direction lines 42, the bending inner side surfaces 54 of the arms 20 belonging to the circumferential direction line 42-1, 42-3, 42-5, or 42-7 positioned at the outer side in the radial direction are hardened. Similar to the example configurations shown in FIGS. 9 and 12, the portion at the outer side in the radial direction or the portion at the inner side in the radial direction of the bending inner side surface 54 may be hardened. In addition, the hardened portion may be formed in the arm 20 belonging to the line at the inner side in the radial direction, of the two circumferential direction lines forming the pair. Further, for pairs in which the damage of the insulating coating is not caused, the hardened portion does not need to be formed.

The invention claimed is:

1. A method of manufacturing a stator of a motor, comprising:
forming a coil segment by bending a flat type conductive wiring in an approximate U shape with two arms;
inserting the coil segment into a slot, of a stator core having teeth arranged in a circumferential direction, between adjacent teeth, wherein the arms of the coil segments are placed to form a radial direction line arranged in a radial direction and to form a circumferential direction line arranged in the circumferential direction;
forming a coil end portion by bending the arm of the coil segment in the circumferential direction, wherein arms belonging to the same circumferential direction line are bent in a first direction and arms belonging to a circumferential direction line adjacent to this circumferential direction line are bent in a second direction which is opposite the first direction; and
welding together tips of corresponding arms, wherein
in the forming the coil segment, at least a part of a bending inner side surface, of a portion which is bent in the forming the coil end portion, of the arms belonging to at least one circumferential direction line is pressurized and hardened.

2. The method of manufacturing the stator of the motor according to claim 1, wherein
in the forming the coil segment, a portion of the bending inner side surface of the arm at an outer side in the radial direction is hardened.

3. The method of manufacturing the stator of the motor according to claim 1, wherein
in the forming the coil end portion, a circumferential direction line pair is formed by two adjacent circumferential direction lines, and the arms are bent in the circumferential direction in an order from a circumferential direction line pair positioned at an outer side or at an inner side in the radial direction, and
the arm which is pressurized and hardened in the forming the coil segment is an arm belonging to a circumferential direction line positioned at an outer side in the radial direction, of the circumferential direction lines forming the circumferential direction line pair.

4. The method of manufacturing the stator of the motor according to claim 1, wherein in the forming the coil end portion, a sectioning wall which sections the circumferential direction lines every two lines is placed between the circumferential direction lines, and the arm is bent in the circumferential direction, and the arm which is pressurized and hardened in the forming the coil segment is an arm belonging to a circumferential direction line positioned at an outer side in the radial direction, of the two sectioned circumferential direction lines.

5. The method of manufacturing the stator of the motor according to claim 1, wherein in the forming the coil segment, a tip of the arm which is welded later is formed into a predetermined shape by pressurization.

\* \* \* \* \*